United States Patent
McKinney et al.

(10) Patent No.: US 11,254,046 B2
(45) Date of Patent: Feb. 22, 2022

(54) FIVE DEGREE OF FREEDOM ADDITIVE MANUFACTURING DEVICE

(71) Applicant: NORTHROP GRUMMAN SYSTEMS CORPORATION, Falls Church, VA (US)

(72) Inventors: Kenneth F. McKinney, San Diego, CA (US); Andrew Simmons, San Diego, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 765 days.

(21) Appl. No.: 15/786,256

(22) Filed: Oct. 17, 2017

(65) Prior Publication Data

US 2019/0111620 A1   Apr. 18, 2019

(51) Int. Cl.
*B29C 64/118* (2017.01)
*B29C 64/227* (2017.01)
*B33Y 30/00* (2015.01)
*B29C 64/241* (2017.01)

(52) U.S. Cl.
CPC .......... *B29C 64/118* (2017.08); *B29C 64/227* (2017.08); *B29C 64/241* (2017.08); *B33Y 30/00* (2014.12)

(58) Field of Classification Search
CPC ... B29C 64/118; B29C 64/245; B29C 64/241; B33Y 30/00
See application file for complete search history.

(56) References Cited

U.S. PATENT DOCUMENTS

| 6,274,839 | B1 | 8/2001 | Stone et al. | |
|---|---|---|---|---|
| 2016/0303801 | A1* | 10/2016 | Chang | B33Y 30/00 |
| 2017/0165917 | A1* | 6/2017 | McKiel, Jr. | B29C 64/386 |
| 2019/0240903 | A1* | 8/2019 | Isobe | B29C 64/232 |

FOREIGN PATENT DOCUMENTS

| DE | 10 2014 011 230 A1 | 1/2016 | |
|---|---|---|---|
| JP | 2018069545 A * | 5/2018 | B29C 64/232 |
| WO | 2016019435 A1 | 2/2016 | |

* cited by examiner

*Primary Examiner* — Abbas Rashid
*Assistant Examiner* — Elisa H Vera
(74) *Attorney, Agent, or Firm* — John A. Miller; Shumaker, Loop & Kendrick, LLP

(57) ABSTRACT

An FDM printer that provides five degree-of-freedom printing capabilities. In one embodiment, the FDM printer includes three transitional drive devices that allow a printer print head to be translationally moved in the X, Y and Z axes planes and a pair of rotationally drive devices that allow a workpiece platform to be rotated in the Y-axis plane and the combined X-axis and Z-axis planes. In this manner, the relative position between the print head and the workpiece platform allows the printer to print complex workpieces in a single continuous print, such as workpieces including large closed, hollow geometries, and without the need for providing support structures for overhangs and the like.

15 Claims, 1 Drawing Sheet

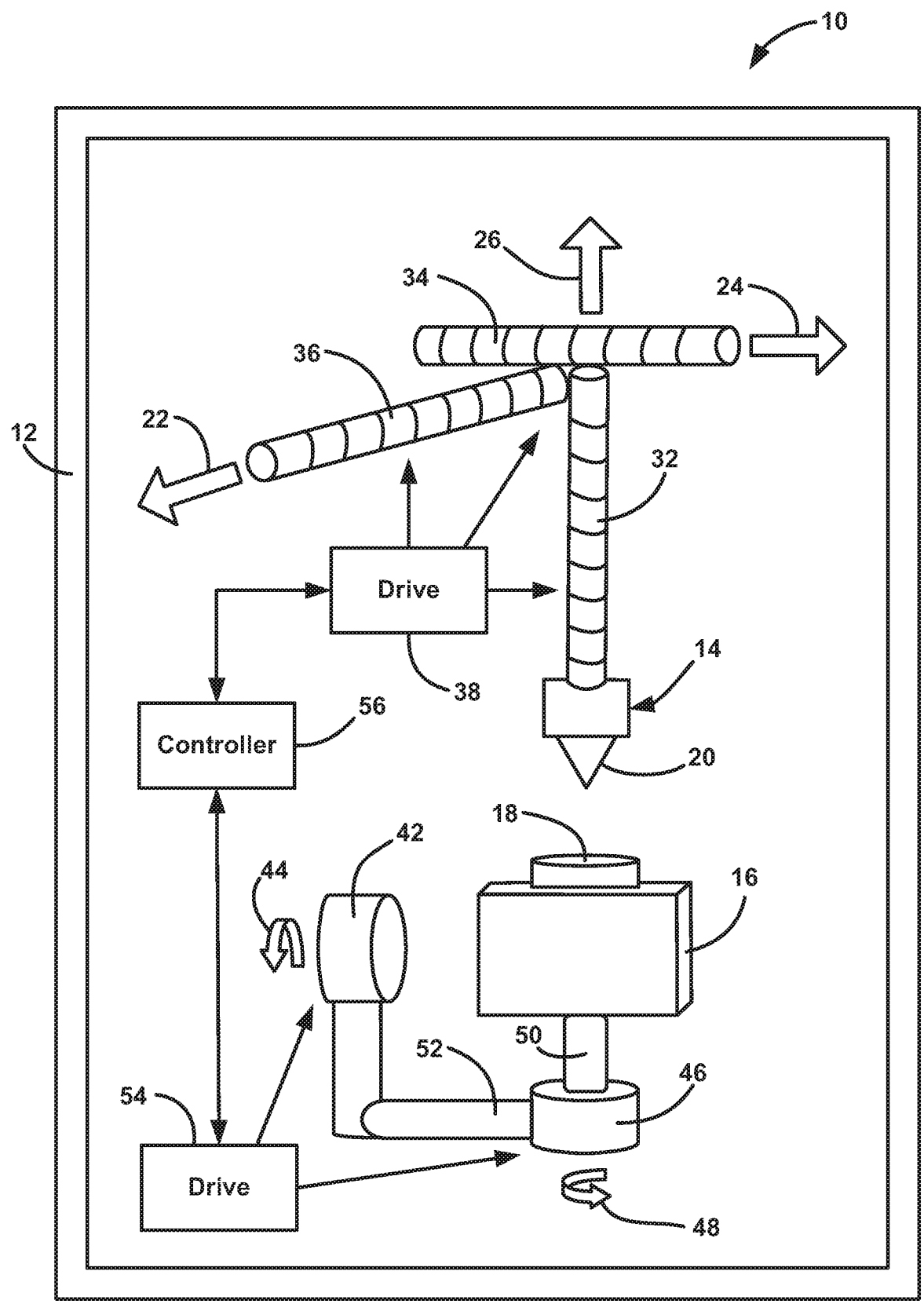

FIVE DEGREE OF FREEDOM ADDITIVE MANUFACTURING DEVICE

BACKGROUND

Field

This invention relates generally to a fused deposition modeling (FDM) printer for printing a three-dimensional part and, more particularly, to an FDM printer for printing a three-dimensional part, where the printer includes three translational drive elements to provide linear translation of the print head in the X, Y and Z axes planes and two rotational drive elements for rotating the part in the Y-axis and combined X-axis and Z-axis planes to provide five degree-of-freedom (DOF) printing capabilities.

Discussion

Fused deposition modeling (FDM) is an additive manufacturing (AM) technology that provides three-dimensional printing of a particular part, referred to herein as a workpiece. More specifically, FDM is a process where a filament of a certain material that is wound on a spool is fed into a heated nozzle, where the filament material becomes molten and is extruded from the nozzle in a controlled manner to build up the workpiece in a layer-by-layer manner. Support structures may also be built up layer-by-layer in the same manner using a second filament and a second heated nozzle. A filament for these types of FDM printers will typically have a diameter of 1.75 mm or 3 mm. FDM utilizes software that processes a stereolithography file (STL) file and includes mathematically slicing and orienting the model to build up the product layer by layer.

Various materials may be used for FDM, such as acrylonitrile butadiene styrene (ABS), polylactic acid (PLA), polycarbonate (PC), polyamide (PA), polystyrene (PS), lignin, rubber, carbon fibers, thermoplastics, polyphenylsufone, ultra high molecular weight polyethylene (UHMWPE) Dyneema, Ultem 9085, high impact polystyrene (HIPS), nylon, high density polyethylene (HDPE) eutectic materials, plasticine, room temperature vulcanization (RTV) silicone, etc. Typically the material is selected to increase the structural properties of the printed products that are made therefrom.

Known FDM printers that fabricate the workpiece by the FDM process referred to above typically only provide linear translation of the printer print head in the X, Y and Z axes. More particularly, when the printer is printing the workpiece, the print head travels in the X and Y axes planes to lay down the extruded material in the desired configuration, and the print head is lifted in the Z axis plane in an incremental manner, which causes the workpiece to grow vertically. When the printer is printing complex workpieces that may include over-hangs and enclosed parts, the use of support structures, mentioned above, such as lattices, are often required to provide the necessary workpiece support as the workpiece is being printed. For example, it may be desirable to provide hollow structures within the workpiece to reduce the weight of the workpiece and also to provide enclosures for other structures or parts within the workpiece. Further, some workpieces that include hollow structures, such as hollow spheres, may not able to be fabricated by the FDM printer because the support structures required to hold the hollow structure while it is being fabricated cannot be removed once the structure is enclosed.

For those workpieces that have external support structures, significant post processing is required after the workpiece is completely laid down to remove the support structures. For example, various solutions and baths are usually employed after the workpiece has been fabricated by the printer that operate to dissolve the material of the support structures without effecting the material of the final workpiece. However, these post processes for removing the support structures add significant time and cost to the printing process. Further, the support structures could cause damage to the workpiece when they are removed as a result of imperfections and defects in the workpiece at the location where the support structures were attached thereto.

SUMMARY

The present invention discloses and describes an FDM printer that provides five degree-of-freedom printing capabilities. In one embodiment, the FDM printer includes three transitional drive devices that allow a printer print head to be translationally moved in the X, Y and Z axes planes and a pair of rotationally drive devices that allow a workpiece platform to be rotated in the Y-axis plane and the combined X-axis and Z-axis planes. In this manner, the relative position between the print head and the workpiece platform allows the printer to print complex workpieces in a single continuous print, such as workpieces including large closed, hollow geometries, and without the need for providing support structures for overhangs and the like.

Additional features of the present invention will become apparent from the following description and appended claims, taken in conjunction with the accompanying drawings.

BRIEF DESCRIPTION OF THE DRAWING

FIG. 1 is a simple illustration of an FDM printer that provides five degree of freedom printing capabilities.

DETAILED DESCRIPTION OF THE EMBODIMENTS

The following discussion of the embodiments of the invention directed to an FDM printer that provides five degree-of-freedom printing capabilities is merely exemplary in nature, and is in no way intended to limit the invention or its applications or uses.

FIG. 1 is an illustration of an FDM printer 10 that is a simple diagram for illustrating a technique according to invention for providing five degree-of-freedom motion between a printer print head and the workpiece being fabricated during the printing process so as to allow the printer 10 to print complex workpieces in a single continuous print, such as workpieces including large closed, hollow geometries, and without the need for providing supporting structures for overhangs and the like as was necessary in the known FDM printers. The printer 10 includes an outer support structure 12 intended to generally represent all of the necessary support structures and devices to accommodate and hold the various features and components of the printer 10 as discussed herein. The printer 10 also includes a print head 14 that includes and is intended to represent all of the print head parts, such as a feed mechanism for feeding a filament (not shown), heaters, extruders, nozzles, etc. that would be found in a typical print head for an FDM printer. In FIG. 1, the print head 14 is shown to include a heated nozzle 20 from which the molted filament material will be extruded. The printer 10 also includes a workpiece platform 16 on which is positioned a workpiece 18 that is being fabricated by the printing process provided by the printer 10. The workpiece 18 is intended to represent any part that can be fabricated by the printing machine 10, either complex or otherwise, and at any stage of the fabrication process. It is noted that the filament that is received by the print head 14 at a top end and the molten filament material that is extruded from the nozzle 20 are not specifically shown.

As will be discussed in detail below, the print head 14 is moveable in a controlled manner in the X, Y and Z axes to allow the workpiece 18 to be laid down and fabricated in the desired configuration, where the X-axis is represented by arrow 22, the Y-axis is represented by arrow 24 and the Z-axis is represented by arrow 26. The printer 10 can include any suitable device for moving the print head 14 in this manner. For example, the printer 10 includes a lead screw 32 for transitionally moving the print head 14 in the Z-axis, a lead screw 34 for transitionally moving the print head 14 in the Y-axis, and a lead screw 36 for moving the print head 14 in the X-axis. It is stressed, however, that the lead screws 32, 34 and 36 are intended to represent any suitable actuation device that is able to move the print head 14 in the direction indicated in combination with each other, as generally represented. Further, although the print head 14 is shown coupled to an end of the screw 32, this is merely for illustrative purposes in that the print head 14 would be a relatively complex assembly of many parts that would be configured relative to the lead screws 32, 34 and 36 in any suitable manner as would be known by those skilled in the art. Further, rotation of the lead screws 32, 34 and 36, either independently or simultaneously to each other, can be provided by any suitable drive device, mechanism, motor, actuator, etc., as is generally represented by drive box 38.

Additionally, the printer 10 includes appropriate actuators for rotating the platform 16 in the Y-axis and the combined X-axis and Z-axis to complete the five degree-of-freedom motion. Particularly, the printer 10 includes an actuatable rotational joint 42 that rotates the platform 16 in the Y-axis as indicated by arrow 44 and an actuatable rotational joint 46 that rotates the platform 16 in the combined X-axis and Z-axis as indicated by arrow 48. In this illustration, the rotational joint 46 is mounted to the platform 16 by arm 50 and the rotational joint 42 is mounted to the rotational joint 46 by an L-shaped arm 52. The rotational joints 42 and 46 can be any actuatable device or element that can provide rotational movement and is suitable for the purposes described herein. Further, the rotational joints 42 and 46 can be driven by any suitable drive device, mechanism, motor, actuator, etc., generally represented by box 54. Although, the joints 42 and 46 rotate the platform 16 in the Y-axis and the combined X-axis and Z-axis as described, it is within the scope of the present invention that alternate embodiments may rotate the platform 16 in a different manner, such as in the X-axis and the combined Y-axis and Z-axis.

When the rotational joint 42 is rotated the L-shaped arm 52 rotates about the Y-axis, which causes the platform 16 and the rotational joint 46 to be rotated therewith, thus orienting the workpiece 18 relative to the print head 14 in the desired manner for the printing process. When the rotational joint 42 positions the platform 16 in the location shown in FIG. 1, rotation of the rotational joint 46 causes the platform 16 to rotate in only the Z-axis. If the rotational joint 42 rotates the platform 16 90° from the position shown in FIG. 1, then rotation of the rotational joint 46 causes the platform 16 to rotate in only the X-axis. Thus, if the rotational joint 42 is positioned at any location between 0° and 90°, where the 0° position of the platform 16 is when the nozzle 20 is generally perpendicular to a top surface of the platform 16, then rotation of the rotational joint 42 positions the platform 16 in the combined X-axis and Z-axis.

A controller 56 controls the drives 38 and 52 so as to control the screws 32, 34 and 36 and the rotational joints 42 and 46 in combination with each other so that as the molten filament material is extruded from the nozzle 20 to build up the workpiece 18, the material can be laid down in a continuous manner without the need to step-wise increase the distance between the platform 16 and the print head 14 in the Z-axis in an incremental manner, as was done in the known FDM printers. More particularly, by adding the rotational movement of the platform 16 as described, the workpiece 18 can be oriented in different directions relative to the print head 14 to allow the continuous printing process.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. An additive manufacturing printer for printing a workpiece, said printer comprising:
   a workpiece platform on which the workpiece is fabricated by the printer;
   a print head spaced apart from the workpiece platform and emitting a printing material for fabricating the workpiece;
   three translational actuatable drive devices coupled to the print head and being operable to each move the print head in one of an X-axis plane, a Y-axis plane and a Z-axis plane; and
   two rotationally actuatable drive devices coupled to the workpiece platform where a first one of the rotationally actuatable devices is operable to rotate the platform in one of the X-axis, Y-axis or Z-axis planes and a second one of the rotationally actuatable devices being operable to rotate the workpiece platform in a combined other two of the X-axis, Y-axis or Z-axis planes, wherein the first rotationally actuatable device is configured to rotate the workpiece platform in the Y-axis plane and the second rotationally actuatable device is configured to rotate the workpiece platform in the combined X-axis and Z-axis planes.

2. The printer according to claim 1 wherein the first rotationally actuatable device is configured to rotate the second rotationally actuatable device and the workpiece platform so that depending on the orientation of the workpiece platform in the Y-axis plane the second rotationally actuatable device will rotate the workpiece platform in the combined X-axis and Z-axis planes.

3. The printer according to claim 2 wherein the second rotationally actuatable device is configured to rotate the workpiece platform in only the Z-axis plane when the workpiece platform is oriented at 0° relative to the Z-axis plane and is configured to rotate the workpiece platform in only the X-axis plane when the workpiece platform is oriented at 90° relative to the Z-axis plane.

4. The printer according to claim 1 wherein the translational actuatable drive devices are lead screws.

5. The printer according to claim 1 wherein the printer is a fused deposition modeling (FDM) printer.

6. The printer according to claim 1 wherein the workpiece is a complex shaped workpiece including overhanging parts and/or hollow parts.

7. The printer according to claim 6 wherein the workpiece is fabricated by the printer without support structures.

8. A fused deposition modeling (FDM) printer for printing a workpiece, said printer comprising:
- a workpiece platform on which the workpiece is fabricated by the printer;
- a print head spaced apart from the workpiece platform and emitting a printing material for fabricating the workpiece; and
- a plurality of actuatable devices that are configured to provide relative movement between the workpiece platform and the print head in five degrees of freedom, wherein the plurality of actuatable devices include three translational actuatable drive devices coupled to the print head and being operable to each move the print head in one of an X-axis plane, a Y-axis plane and a Z-axis plane, and two rotationally actuatable drive devices coupled to the workpiece platform where a first one of the rotationally actuatable devices is operable to rotate the platform in one of the X-axis, Y-axis or Z-axis planes and a second one of the rotationally actuatable devices being operable to rotate the workpiece platform in a combined other two of the X-axis, Y-axis or Z-axis planes, and wherein the first rotationally actuatable device is configured to rotate the workpiece platform in the Y-axis plane and the second rotationally actuatable device is configured to rotate the workpiece platform in the combined X-axis and Z-axis planes.

9. The FDM printer according to claim 8 wherein the first rotationally actuatable device is configured to rotate the second rotationally actuatable device and the workpiece platform so that depending on the orientation of the workpiece platform in the Y-axis plane the second rotationally actuatable device will rotate the workpiece platform in the combined X-axis and Z-axis planes.

10. The FDM printer according to claim 9 wherein the second rotationally actuatable device is configured to rotate the workpiece platform in only the Z-axis plane when the workpiece platform is oriented at 0° relative to the Z-axis plane and is configured to rotate the workpiece platform in only the X-axis plane when the workpiece platform is oriented at 90° relative to the Z-axis plane.

11. The FDM printer according to claim 8 wherein the translational actuatable drive devices are lead screws.

12. A fused deposition modeling (FDM) printer for printing a workpiece, said printer comprising:
- a workpiece platform on which the workpiece is fabricated by the printer;
- a print head spaced apart from the workpiece platform and emitting a printing material for fabricating the workpiece;
- three translational actuatable drive devices coupled to the print head and being operable to each move the print head in one of an X-axis plane, a Y-axis plane and a Z-axis plane; and
- a first rotationally actuatable drive device configured to rotate the workpiece platform in the Y-axis plane and a second rotationally actuatable drive device configured to rotate the workpiece platform in combined X-axis and Z-axis planes, wherein the second rotationally actuatable device is configured to rotate the workpiece platform in only the Z-axis plane when the workpiece platform is oriented at 0° relative to the Z-axis plane and is configured to rotate the workpiece platform in only the X-axis plane when the workpiece platform is oriented at 90° relative to the Z-axis plane so as to allow the printer to print complex workpieces in a single continuous print.

13. The FDM printer according to claim 12 wherein the translational actuatable drive devices are lead screws.

14. The FDM printer according to claim 12 wherein the workpiece is a complex shaped workpiece including overhanging parts and/or hollow parts.

15. The FDM printer according to claim 14 wherein the workpiece is fabricated by the printer without support structures.

* * * * *